(12) United States Patent  
Jennings, III

(10) Patent No.: US 7,584,234 B2  
(45) Date of Patent: Sep. 1, 2009

(54) METHOD AND APPARATUS FOR NARROW TO VERY WIDE INSTRUCTION GENERATION FOR ARITHMETIC CIRCUITRY

(75) Inventor: Earle Willis Jennings, III, Kensington, CA (US)

(73) Assignee: QSigma, Inc., Sunnyvale, CA (US)

( * ) Notice: Subject to any disclaimer, the term of this patent is extended or adjusted under 35 U.S.C. 154(b) by 768 days.

(21) Appl. No.: 10/678,570

(22) Filed: Oct. 3, 2003

(65) Prior Publication Data

US 2004/0073588 A1    Apr. 15, 2004

Related U.S. Application Data

(60) Provisional application No. 60/454,755, filed on Mar. 14, 2003, provisional application No. 60/470,100, filed on May 12, 2003.

(51) Int. Cl.
*G06F 1/02* (2006.01)
(52) U.S. Cl. ...................................... 708/277
(58) Field of Classification Search ................. 708/277, 708/512, 517
See application file for complete search history.

(56) References Cited

U.S. PATENT DOCUMENTS

| | | | | |
|---|---|---|---|---|
| 4,569,018 A | * | 2/1986 | Hummel et al. ............. | 711/207 |
| 4,682,302 A | * | 7/1987 | Williams ...................... | 708/670 |
| 5,197,024 A | * | 3/1993 | Pickett ........................ | 708/517 |
| 5,944,774 A | * | 8/1999 | Dent ........................... | 708/517 |
| 6,981,127 B1 | * | 12/2005 | Singh et al. .................. | 712/204 |
| 7,134,001 B1 | * | 11/2006 | Coon et al. .................. | 712/204 |
| 2003/0084270 A1 | * | 5/2003 | Coon et al. .................. | 712/204 |

* cited by examiner

*Primary Examiner*—Tan V Mai
(74) *Attorney, Agent, or Firm*—Earle Jennings

(57) ABSTRACT

A method and apparatus for generating a wide instruction controlling at least one data processing resource, local to that data processing resource, by accessing a local wide instruction memory based upon a narrow instruction, to generate at least part of the wide instruction. The local wide instruction memory can be accessed on every instruction cycle to reconfigure the controlled data processing resource(s). The data processing resources preferably includes arithmetic resources acting on the logarithms of various data inputs to generate a spectrum of non-additive results. A preferred embodiment permits the narrow instruction to include a designator field, a first narrow field and a second narrow field. The designator field is used by the local wide instruction memories to select which of the first and second narrow fields to use in accessing the memory for controls of a specific resource. Use in a graphics shader with four datapath columns is shown. Another preferred use is shown in a Digital Signal Processor (DSP) is also shown.

14 Claims, 6 Drawing Sheets

METHOD AND APPARATUS FOR NARROW TO VERY WIDE INSTRUCTION GENERATION FOR ARITHMETIC CIRCUITRY

CROSS REFERENCES TO RELATED APPLICATIONS

This application is related to the following provisional applications filed with the United States Patent and Trademark Office:

Ser. No. 60/204,113, entitled "Method and apparatus of a digital arithmetic and memory circuit with coupled control system and arrays thereof", filed May 15, 2000 by Jennings;

Ser. No. 60/215,894, entitled "Method and apparatus of a digital arithmetic and memory circuit with coupled control system and arrays thereof", filed Jul. 5, 2000 by Jennings;

Ser. No. 60/217,353, entitled "Method and apparatus of a digital arithmetic and memory circuit with coupled control system and arrays thereof", filed Jul. 11, 2000 by Jennings;

Ser. No. 60/231,873, entitled "Method and apparatus of a digital arithmetic and memory circuit with coupled control system and arrays thereof", filed Sep. 12, 2000 by Jennings;

Ser. No. 60/261,066, entitled "Method and apparatus of a DSP resource circuit", filed Jan. 11, 2001 by Jennings; and Ser. No. 60/282,093, entitled "Method and apparatus of a DSP resource circuit", filed Apr. 6, 2001 by Jennings.

This application claims priority from the following provisional applications filed with the United States Patent and Trademark Office:

Ser. No. 60/314,411, entitled "Method and apparatus for high speed calculation of nonlinear functions", filed Aug. 22, 2001 by Jennings;

Ser. No. 60/325,093, entitled "A 64 point FFT Engine", filed Sep. 25, 2001 by Jennings;

Ser. No. 60/365,416, entitled "Methods and apparatus compiling non-linear functions, matrices and instruction memories and the apparatus resulting therefrom", filed Mar. 18, 2002 by Jennings and Landers;

Ser. No. 60/402,346, entitled "Method and apparatus providing time division multiplexed arithmetic resources for digital signal processing and emulation of instruction memories", filed Aug. 9, 2002 by Jennings and Landers;

Ser. No. 60/416,607, entitled "Method and apparatus providing time division multiplexed arithmetic resources for digital signal processing", filed Aug. 9, 2002 by Jennings and Landers;

Ser. No. 60/454,755, entitled "Method and apparatus providing configurable generation of a very long instruction word based upon a narrow instruction, and using a fixed package pinout to provide a spectrum of arithmetic capability, capacity, performance, programmability and memory", filed Mar. 14, 2003 by Jennings and Landers; and Ser. No. 60/470,100, entitled "Method and apparatus implementing and using at least one logarithmic calculator to optimize floating point performance in a graphics accelerator", filed May 13, 2003 by Jennings and Landers.

This application claims priority as a continuation in part from the following application filed with the United States Patent and Trademark Office:

Ser. No. 10/276,414, filed Nov. 12, 2002, which is the national stage application based upon, Serial number PCT/US 01/15,541, entitled "Method and apparatus of DSP resource allocation and use", filed May 14, 2001 by Jennings;

Ser. No. 10/226,735, entitled "Method and apparatus for high speed calculation of nonlinear functions and networks using non-linear function calculators in digital signal processing", filed Aug. 22, 2002; and Ser. No. 10/155,502, filed May 23, 2002.

TECHNICAL FIELD

This invention relates to very wide instructions controlling arithmetic resources.

BACKGROUND OF INVENTION

Today, digital systems in a variety of applications including both Digital Signal Processing (DSP hereafter) and graphics accelerators, require the performance of many complex algorithms. These algorithms often use a wide cross section of specialized non-additive operations and non-linear functions to achieve their desired results.

These algorithmic requirements place significant strains on how data is processed in these application systems. On one hand, the more arithmetic resources processing the data, the greater the throughput. On the other hand, the more resources there are to control, the wider the instruction controlling these units needs to be, to provide the flexibility to optimally use these resources.

The wider the instruction word, the greater the systems overhead in operating the data processing resources. The system overhead may include, but is not limited to, the interfacing to external memories, the external memories, the instruction cache, and the general layout issue of routing many wires carrying these instruction signals to where they are needed. All of these are significant problems, often greatly increasing the cost of production, operational heat generation, and the general feasibility of such solutions.

Mechanisms and methods are needed to operate multiple data processing resources based upon a narrow instruction which can generate a wide instruction where needed. These methods and mechanisms need to minimize the routing and other overhead associated with moving wide instructions every cycle.

SUMMARY OF INVENTION

The invention includes a method and apparatus for generating a wide instruction controlling at least one data processing resource, local to that data processing resource, by accessing a local wide instruction memory based upon a narrow instruction, to generate at least part of the wide instruction. The local wide instruction memory can be accessed on every instruction cycle to reconfigure the controlled data processing resource(s).

The data processing resources preferably include arithmetic resources acting on the logarithms of various operands, which can generate a spectrum of non-additive results as configured by the wide instructions. These arithmetic resources preferably provide at least some of the following: multiplicative products of at least two operands, multiplicative products using a power of at least one operand, such as the square root, the square, 1/the square root, a number raised to an operand, an operand raised to a specified power, which may be another operand, and the logarithm of an operand.

An application of the invention to a graphics accelerator pipeline is sketched. The application is a shader calculator, which shows the use of a preferred narrow instruction controlling a data path including 16 programmable arithmetic resources, known herein as logalus, which effect all the operations discussed above. These logalus may have at least 16 controls signals each, collectively requiring at least 256 instruction bits.

A further preferred embodiment permits the narrow instruction to include three fields, a designator field, a first narrow field and a second narrow field. The designator field is used by the local wide instruction memories to select which of the first and second narrow fields to use in accessing the memory for controls of a specific resource.

One preferred use of this embodiment is in a graphics shader with four datapath columns. One designation may allow three of the four vertical datapaths to perform a 3-vector based operation, while the fourth vertical datapath may perform a different set of operations, often known as scalar processing. Another designation may allow all four columns to be used in a 4-vector based operation.

Another preferred use of such embodiments is in a DSP application with four vertical datapath columns allows independent use of two columns for complex number arithmetic, such as found in Fast Fourier Transforms (FFTs), while the remaining two columns may be used for separate purposes, which may involve other functions.

The invention also includes methods and apparatus for translating a program using these data processing resources into the local wide instruction memory contents required to optimally use the data processing resources.

These and many other advantages will become apparent to those skilled in the art upon considering the Figures, their description and the claims.

DETAILED DESCRIPTION OF DRAWINGS

The invention includes a method and apparatus for generating a wide instruction controlling at least one data processing resource, local to that data processing resource, by accessing a local wide instruction memory based upon a narrow instruction, to generate at least part of the wide instruction. The local wide instruction memory can be accessed on every instruction cycle to reconfigure the controlled data processing resource(s).

The data processing resources preferably include arithmetic resources acting on the logarithms of various operands, which can generate a spectrum of non-additive results as configured by the wide instructions. These arithmetic resources preferably provide at least some of the following: multiplicative products of at least two operands, multiplicative products using a power of at least one operand, such as the square root, the square, 1/the square root, a number raised to an operand, an operand raised to a specified power, which may be another operand, and the logarithm of an operand.

Figure 1A:
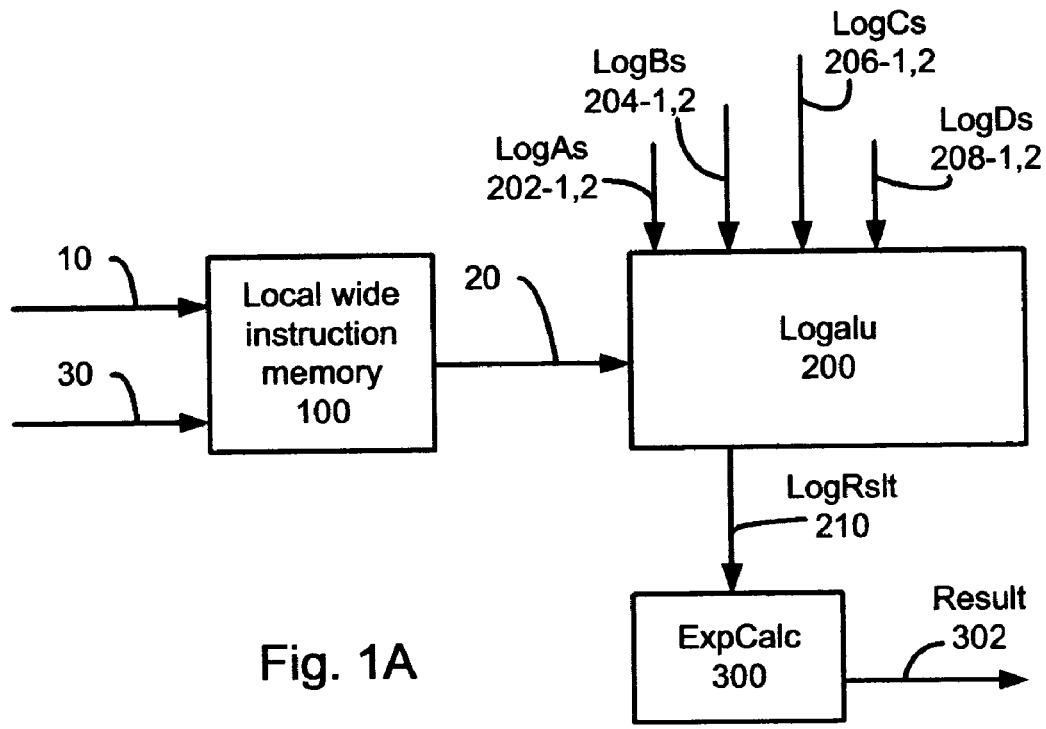
FIG. 1A shows a narrow instruction accessing a local wide instruction memory to create at least partly create one wide instruction presented to a logalu to configure the logalu to process at least two log-operands.

FIG. 1A shows a narrow instruction 10 provided to a local wide instruction memory 100 to at least partly create the wide instruction 20 presented to a logalu 200 to configure the logalu 200 to process at least two, and in this Figure, four pairs of log-operands. The log-operand pairs are the following. LogA1 202-1, LogA2 202-2; LogB1 204-1, LogB2 204-2; LogC1 206-1, LogC2 206-2; and LogD1 208-1, and LogD2 208-2.

In certain embodiments of the invention's local wide instruction memory 100 receives a write instruction 30, as in FIG. 1A. Preferably, the response of the local wide instruction memory 100 to the narrow instruction 10 is altered based upon the write instruction 30.

Figure 3:
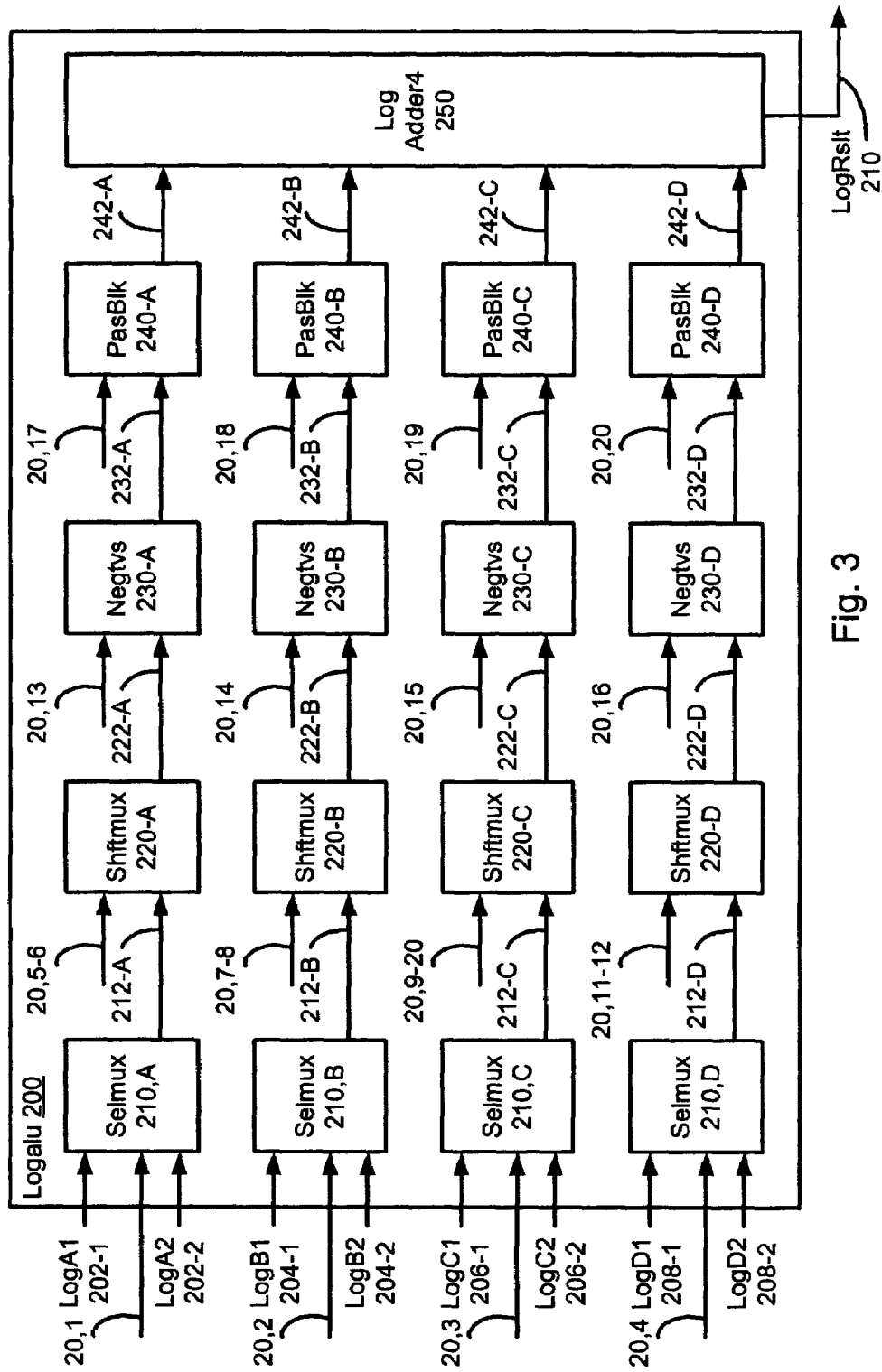
FIG. 3 shows one embodiment of the logalu of FIGS. 1A to 2, receiving fours pairs of log-operands, with a wide instruction of 20 bits providing controls for selecting, shifting, negating, and blocking for four log-operand inputs to a log adder, which generates the log-result.

The logalu 200 of FIG. 1A is configured by the wide instruction 20 to operate on the four pairs of log-operands as shown in FIG. 3. The logalu 200 receives fours pairs of log-operands 202-1,2 to 208-1,2, with a wide instruction 20 containing twenty bits 20-1 to 20-20.

Wide instruction bits 20-1 to 204 control selection within the pairs of log-operands in FIG. 3.

Wide instruction bit 20-1 provides a control for Selmux 210-A to select between LogA1 202-1 and LogA2 202-2 to create LogSelA 212-A which is provided to Shftmux 220-A.

Wide instruction bit 20-2 provides a control for Selmux 210-B to select between LogB1 204-1 and LogB2 204-2 to create LogSelB 212-B which is provided to Shftmux 220-B.

Wide instruction bit 20-3 provides a control for Selmux 210-C to select between LogC1 206-1 and LogC2 206-2 to create LogSelC 212-C which is provided to Shftmux 220-C.

Wide instruction bit 204 provides a control for Selmux 210-D to select between LogD1 208-1 and LogD2 208-2 to create LogSelD 212-D which is provided to Shftmux 220-D.

Wide instruction bits 20-5 to 20-12 control log-domain shifting of the selected log-operands in FIG. 3.

Wide instruction bits 20-5,6 provide controls for Shftmux 220-A shifting LogSelA 212-A to create a LogSfhtA 222-A, which is provided to Negtvs 230-A.

Wide instruction bits 20-7,8 provide controls for Shftmux 220-B shifting LogSelB 212-B to create a LogSfhtB 222-B, which is provided to Negtvs 230-B.

Wide instruction bits 20-9,10 provide controls for Shftmux 220-C shifting LogSelC 212-C to create a LogSfhtC 222-C, which is provided to Negtvs 230-C.

Wide instruction bits 20-11,12 provide controls for Shftmux 220-D shifting LogSelD 212-D to create a LogSfhtD 222-D, which is provided to Negtvs 230-D.

Wide instruction bits 20-13 to 20-16 control log-domain negation of the shifted, selected log-operands in FIG. 3.

Wide instruction bit 20-13 provides a control for Negtvs 230-A to possibly negate LogSfhtA 222-A, to create LogNegA 232-A.

Wide instruction bit 20-14 provides a control for Negtvs 230-B to possibly negate LogSfhtB 222-B, to create LogNegB 232-B.

Wide instruction bit 20-15 provides a control for Negtvs 230-C to possibly negate LogSfhtC 222-C, to create LogNegC 232-C.

Wide instruction bit 20-16 provides a control for Negtvs 230-D to possibly negate LogSfhtD 222-D, to create LogNegD 232-D.

Wide instruction bits 20-17 to 20-20 control passing or blocking the possibly negated, shifted, selected log-operands to create the four processed log-operands 242-A to 242-D presented to the LogAdder4 250, which generates the log domain result 210 in FIG. 3.

Wide instruction bit 20-17 provides a control for PasBlk 240-A to pass or block the LogNegA 232-A to create the processed log-operand A 242-A.

Wide instruction bit 20-18 provides a control for PasBlk 240-B to pass or block the LogNegB 232-B to create the processed log-operand B 242-B.

Wide instruction bit 20-19 provides a control for PasBlk 240-C to pass or block the LogNegC 232-C to create the processed log-operand C 242-C.

Wide instruction bit 20-20 provides a control for PasBlk 240-D to pass or block the LogNegD 232-D to create the processed log-operand D 242-D.

As used herein, a log calculator generates a log-operand by at least performing some version of a logarithm upon an operand. An exponential calculator generates a result by at least performing some version of an exponential upon its log-operand input. The logarithm and exponential are preferably, approximately inverses of each other for a wide range of inputs. Further, the logarithm and exponential are preferably evaluated base the number two.

The logalu 200 shown in FIGS. 1A and 3 effects the multiplicative product of the processed log operands 242-A to 242-D, upon the output result 302 from the exponential calculator 300 of FIG. 1A.

The log result 210 generated by the logalu 200 of FIGS. 1A and 3 is provided to an exponential calculator 300 to generate the non-additive result 302, in FIG. 1A. By way of example, assume that log-operand A1 202-1 is generated by a log calculator 310 as in FIG. 6. Assume an operand A is presented to the Log calculator to create log-operand A1 202-1. The contribution of the processed log-operand A 242-A may have at least some of the following multiplicative effects on the non-additive result 302:

an approximation of the operand A,
an approximation of a square root of the operand A,
an approximation of a multiplicative inverse of the operand A,
an approximation of a multiplicative inverse of the square root of the operand A,
an approximation of a square of the operand A, and
an approximation of a multiplicative inverse of the square of the operand A.

The approximations preferably satisfy a precision standard.

Further, the precision standard preferably supports a member of a programming languages collection comprising: a version of Java, a version of C, a version of OpenGL, and a version of DirectX. Versions of C include, but are not limited to, standard C, Kernighan and Ritchie C, C++, ObjectiveC, Cg, and DspC.

Figure 2:
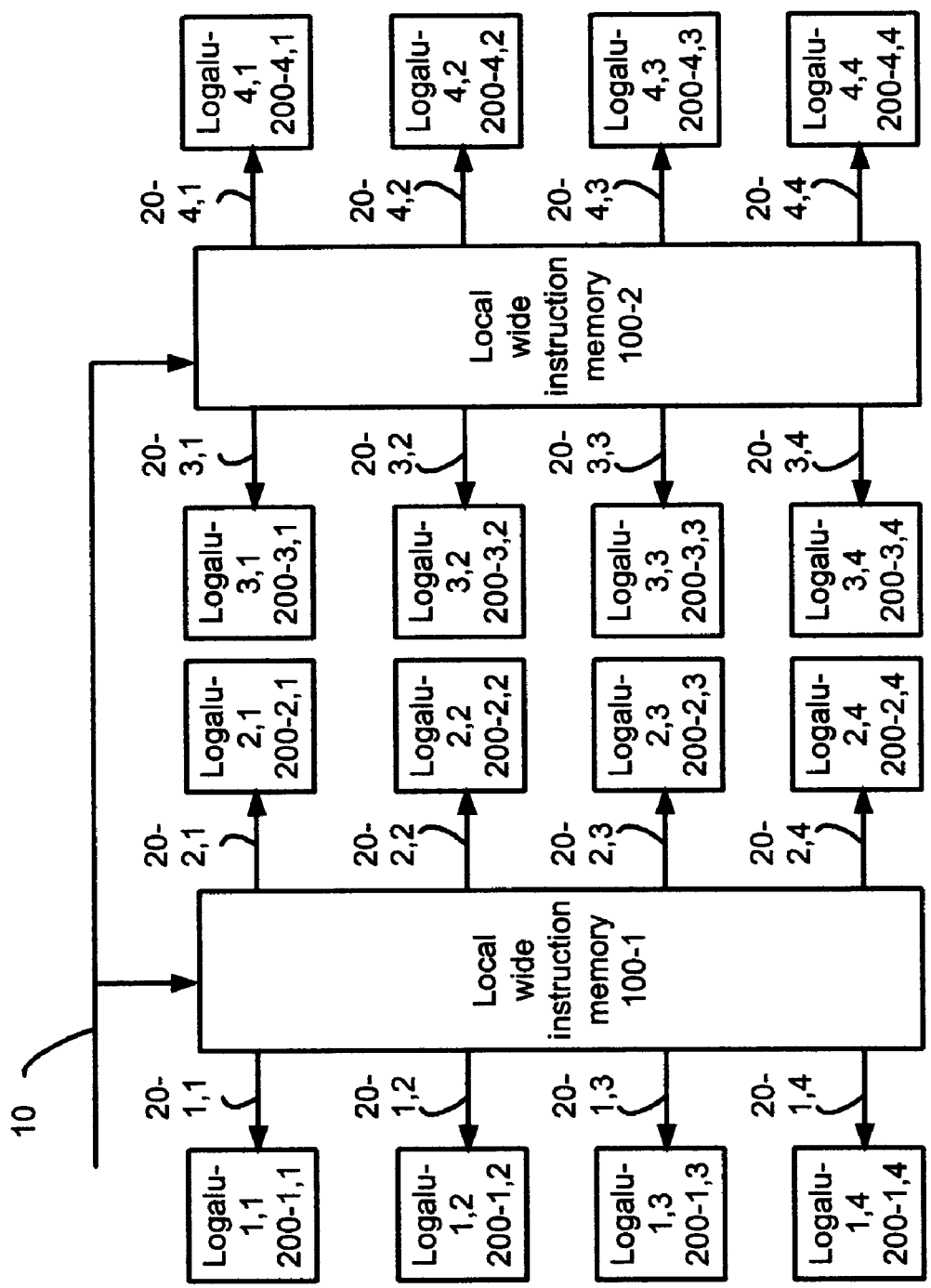
FIG. 2 shows more than one local wide instruction memory, each providing wide instructions to more than one logalu, the logalus arranged in rows and columns.
Figure 6:
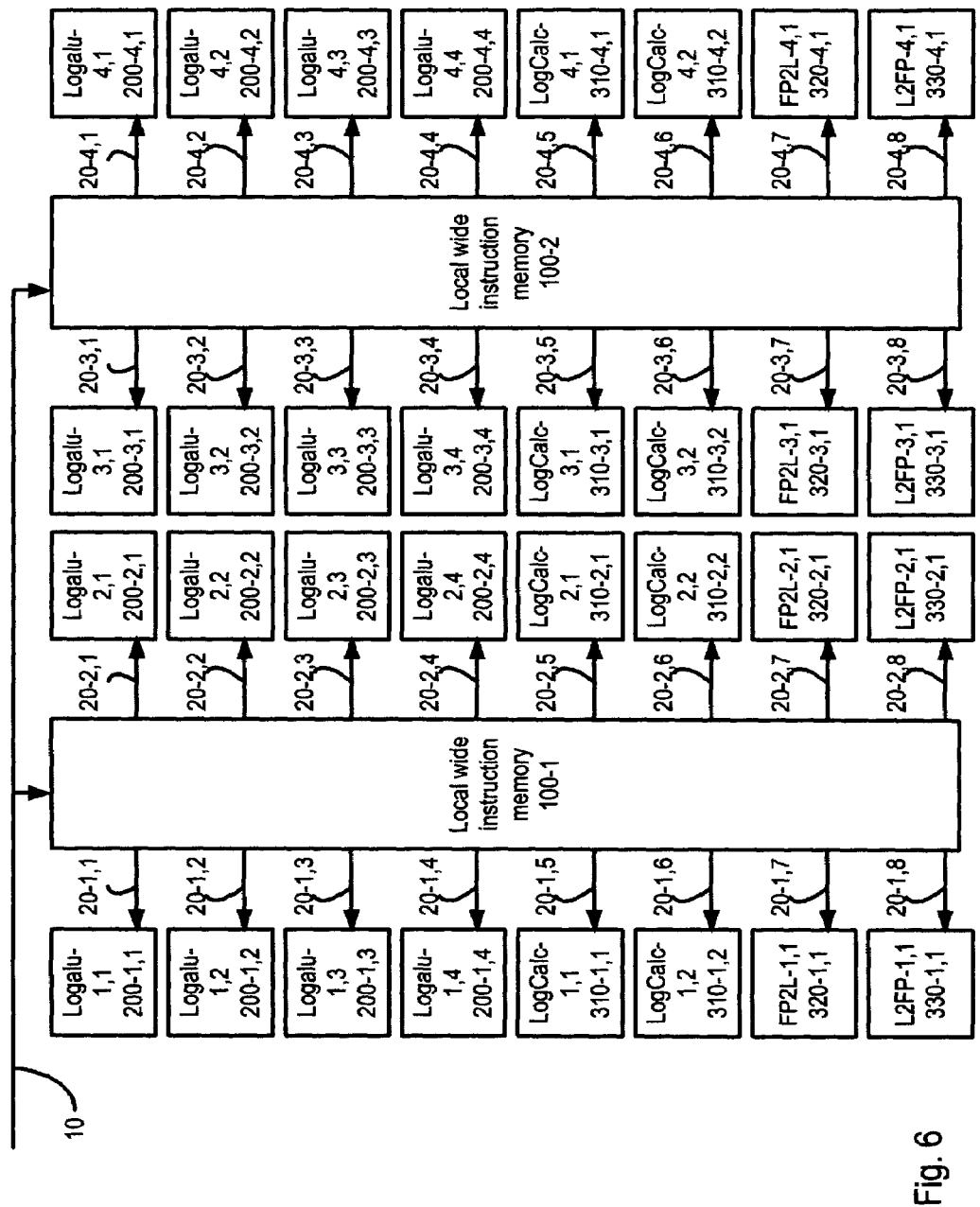
FIG. 6 shows a preferred use of the local wide instruction memories of FIG. 2 further providing wide instructions to additional units.

The systems overhead for each logalu 200 as shown in FIG. 3 is twenty bits of control. When an array including 16 of these resources, as shown in FIGS. 2 and 6, is to be used, the price of independent programming capability for these resources alone is over 300 bits of control. Routing these signal long distances within an integrated circuit, much less transferring them to and from an external memory, or caching them for access on every cycle, would be very expensive.

The inventor realized that in at least graphics accelerator and DSP applications, application programs are relatively short, and can only use a relatively small number of distinct configurations of such resources.

Figure 1B:
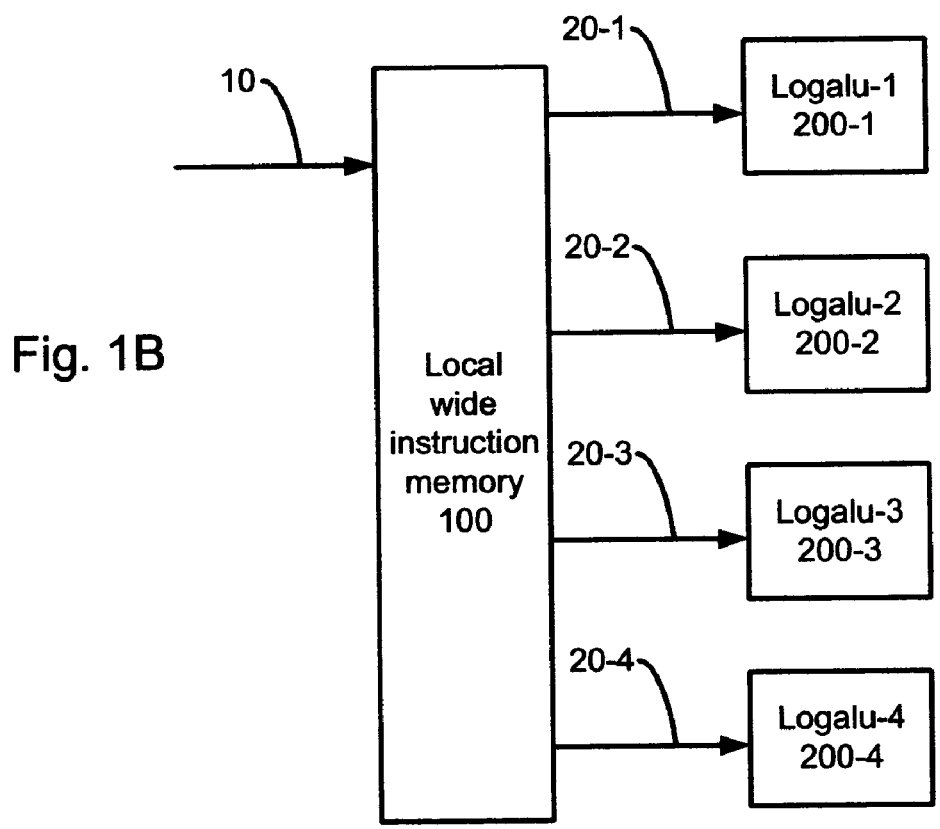
FIG. 1B shows a local wide instruction memory providing wide instructions to more than one logalu.

FIG. 1B shows a local wide instruction memory 100 providing at least partly separate wide instructions 20-1 to 204 associated with several logalus 200-1 to 200-4.

FIGS. 2 and 6 show application of the invention to a graphics accelerator pipeline or a DSP resource array. These application may use a preferred narrow instruction of 6 to 8 bits to control a data path which may include 16 programmable logalu arithmetic resources. These logalu resources, in conjunction with exp calculators 300 of FIG. 1A and possibly log calculators 310 of FIG. 6, effect at least all the operations discussed above. The logalus 300 as shown in FIG. 3 have at least 16 controls signals each, collectively requiring at least 256 instruction bits. One preferred use of this embodiment in applications with four datapath columns.

A further preferred embodiment permits the narrow instruction 10 to include three fields, a designator field 12, a first narrow field 14 and a second narrow field 16, as shown in FIGS. 4A to 5B. The designator field 12 is used by the local wide instruction memories 100 to select which of the first and second narrow fields 14 and 16 to use in accessing 112 the local wide memory 120 for controls 20 of a specific resource.

The means for selecting in of FIGS. 4A to 5B may include a selection configuration circuit 110, the designator field 12, in response to which, the circuit 110 selects from the first and second narrow fields 14 and 16 to at least partly create at least one selected narrow instruction 112.

Figure 4A:
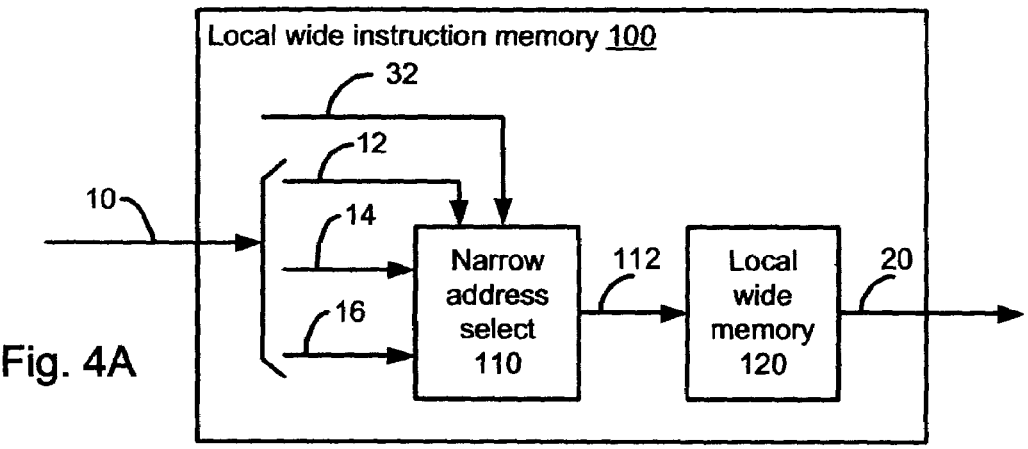
FIG. 4A shows the local wide instruction memory of FIG. 1A, further receiving the narrow instruction including a designator field, a first narrow field and a second narrow field.

In certain further preferred embodiments the selection configuration circuit 110 receives a configuration signal 32 as in FIG. 4A. The configuration signal 32 may alter an internal state within the selection configuration circuit 110, which may further alter the selections based upon the designator field 12.

The use of the designator 12 and two narrow fields 14 and 16, to a graphics accelerator may be seen in the following example. One designation may allow three of the four vertical datapaths to perform a 3-vector based operation, while the fourth vertical datapath may perform a different set of operations, often known as scalar processing. Another designation may allow all four columns to be used in a 4-vector based operation.

Another preferred use of the designator 12 and two narrow fields 14 and 16, in a DSP application with four vertical datapath columns may allow independent use of two columns for complex number arithmetic, such as found in Fast Fourier Transforms (FFTs), while the remaining two columns may be used for separate purposes, which may involve other functions.

FIGS. 2 and 6 show the invention including more than one local wide instruction memory 100-1 and 100-2, each providing at least partly separate wide instructions to more than one logalu.

The logalus of FIGS. 2 and 6 are arranged in rows and columns as follows. Column i includes logalu-i,1, logalu-i,2, logalu-i,3, and logalu-i,4, for i=1, 2, 3, and 4. Row j includes logalu-1,j, logalu-1,j, logalu-3,j, and logalu-4,j, for j=1, 2, 3 and 4.

In certain further preferred embodiments, as shown in FIG. 6, additional arithmetic resources may be provided the wide instruction at least partly generated by local wide instruction memories. Examples of these resources include, but are not limited to, log calculators 310, format converters from floating point to the logarithmic operand notation 320 and from the logarithmic operand notation to floating point 330.

FIG. 4A shows the local wide instruction memory of FIG. 1A, further receiving the narrow instruction 10 including a designator field 12, a first narrow field 14 and a second narrow field 16. Such embodiments of the invention include a means for selecting the narrow address controlled at least partly by designator 12 from the first and second narrow fields 14 and 16 to create at least one selected narrow instructions 112. The selected narrow instruction 112 is presented to a local wide memory 120. The local wide memory 120 responds to the selected narrow instruction 112 to at least partly generate the wide instruction 20.

Figure 4B:
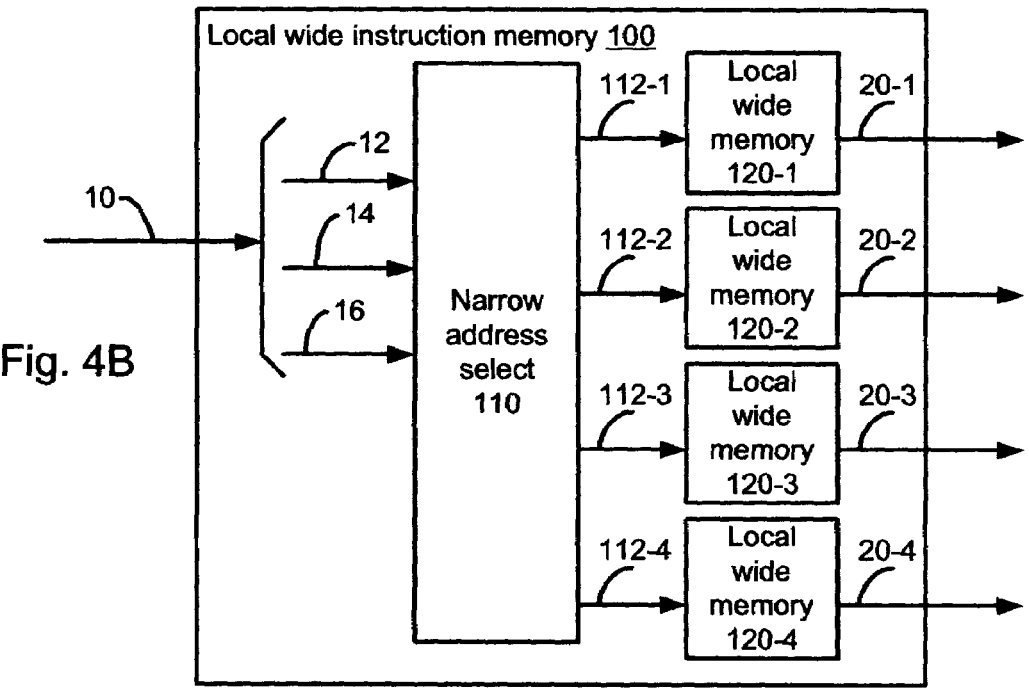
FIG. 4B shows the local wide instruction memory of FIG. 1B, receiving the narrow instruction as in FIG. 4A.

FIG. 4B shows the local wide instruction memory 100 of FIG. 1B, receiving the narrow instruction 10 as in FIG. 4A, with multiple local wide memories 120-1 to 1204, each presented at least partly separate selected narrow instructions 112-1 to 112-4. Each of the local wide memories 120-1 and 120-4, responds to its selected narrow instruction 112-1 to 1124, creating the wide instructions 20-1 to 204.

Figure 5A:
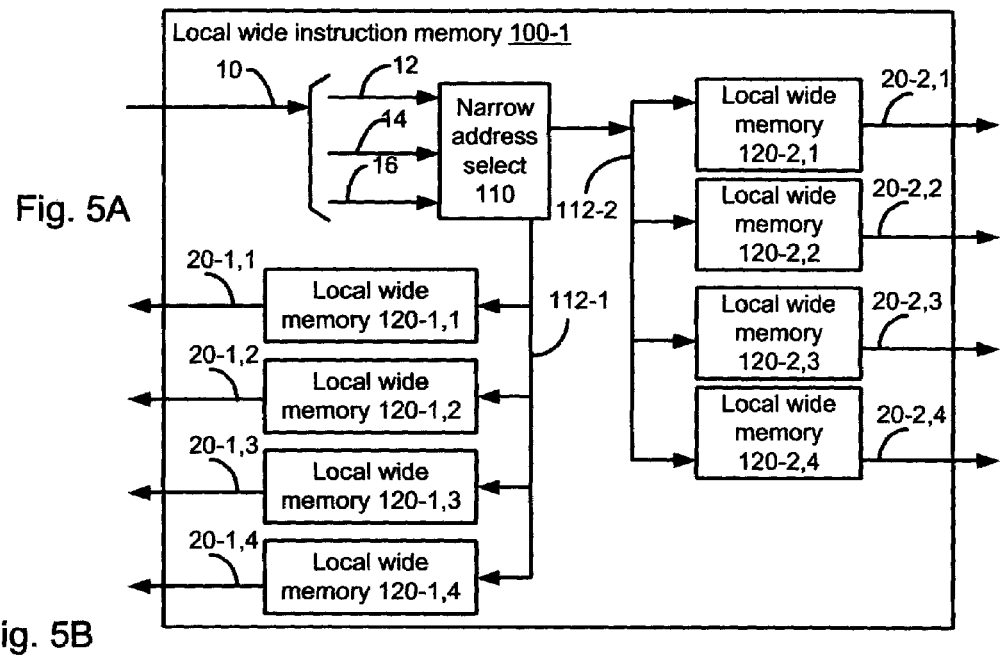
FIG. 5A shows one of the local wide instruction memories of FIG. 2, providing separate selected narrow instructions to the local wide memories associated with the two columns of logalus.

FIG. 5A shows one of the local wide instruction memories 100-1 of FIGS. 2 and 6, providing separate selected narrow instructions 112-1 and 112-2 to the local wide memories associated with the two columns of logalus.

Figure 5B:
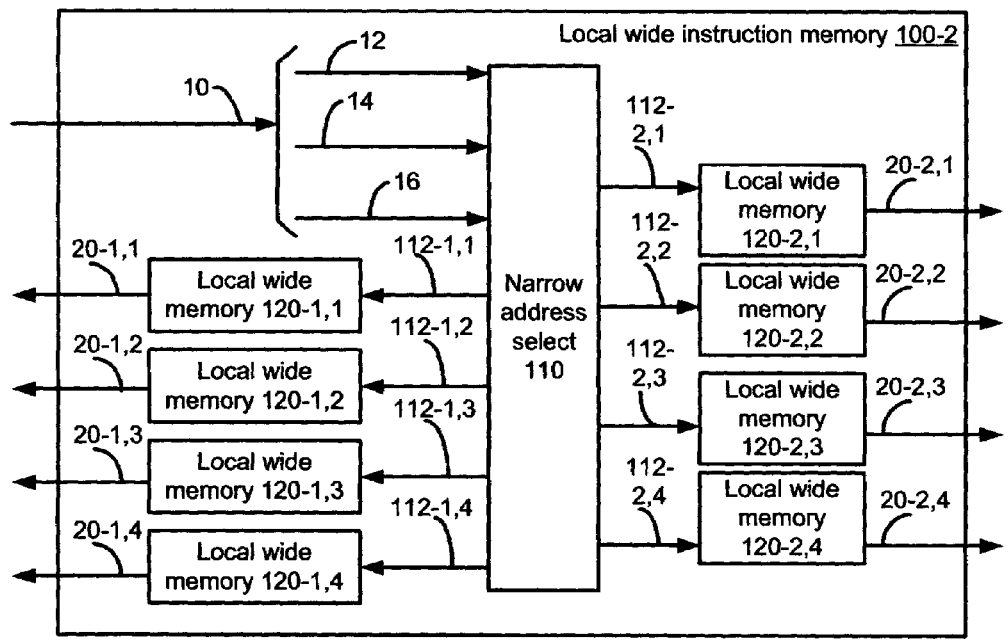
FIG. 5B shows an alternative local wide instruction memory of FIG. 2, providing separate selected narrow instructions to each of the local wide memories associated with the logalus.

FIG. 5B shows an alternative local wide instruction memory 100-2 of FIGS. 2 and 6, providing separate selected narrow instructions 112-1,1 through 112-2,4 to each of the local wide memories 120-1,1 through 120-2,4 associated with the logalus of FIGS. 2 and 6.

The preceding embodiments of the invention have been provided by way of example and are not meant to constrain the scope of the following claims.

The invention claimed is:

1. An apparatus operating a first number of a logalu, each using a wide instruction, comprising:
 a narrow instruction provided to a local wide instruction memory;
 said local wide instruction memory at least partly creating said wide instruction in response to said narrow instruction;
 said logalu receiving said wide instruction;
 said logalu configured based upon said wide instruction to operate upon a second number of a log-operand;
 wherein said first number is at least one; and
 wherein said second number is at least two.

2. The apparatus of claim 1, wherein said first number is at least two.

3. The apparatus of claim 2, wherein said logalu receiving said wide instruction is further comprised, for each of said logalus: said logalu receiving said wide instruction.

4. The apparatus of claim 2, wherein said wide instruction for at least two of said logalus is at least partly distinct.

5. The apparatus of claim 1, wherein said narrow instruction is comprised of a designator field, a first narrow field and a second narrow field;
 wherein said local wide instruction memory responding to said narrow instruction, is further comprised of:
 a means for selecting from said first narrow field and said second narrow field based upon said designator field to provide a selected narrow instruction to said local wide memory; and
 said local wide memory responding to said selected narrow instruction to at least partly create said wide instruction.

6. The apparatus of claim 5, wherein the means for selecting is further comprised of:
 presenting said designator field to a selection configuration circuit; and
 said selection configuration circuit responding to said designator field to select from said first narrow field and said second narrow field to create said selected narrow instruction.

7. The apparatus of claim 6, further comprising:
 means for providing a configuration signal to said selection configuration circuit; and
 means for altering a state in said selection configuration circuit based upon said configuration signal.

8. The apparatus of claim 7, wherein said state resides in a selection configuration memory included in said selection configuration circuit.

9. The apparatus of claim 1, further comprising:
 means for providing said local wide instruction memory with a write instruction;
 wherein said local wide instruction memory responding to said narrow instruction is at least partly altered based upon said write instruction.

10. A apparatus of generating a non-additive result based upon said second number of a log2 operand of claim 1, comprising:
 said apparatus of claim 1 operating said logalu;
 means for providing said log-operands to said logalu;
 said logalu responding to said log-operands and to said wide instruction to create a log-result presented to an exponential calculator; and
 said exponential calculator responding to said log-result to create said non-additive result.

11. The apparatus of claim 10, wherein said non-additive result includes a first multiplicative component and a second multiplicative component;
 wherein said first multiplicative component is a member of the non-additive primitive collection based upon a first of said log-operands;
 wherein said second multiplicative component is a member of said non-additive primitive collection based upon a second of said log-operands;
 wherein said non-additive primitive collection based upon one of said log-operands includes:
 an exponential of said one log-operand,
 an exponential of a half of said one log-operand,
 an exponential of a negative of said one log-operand,
 an exponential of a negative of said half of said one log-operand,
 an exponential of a double of said one log-operand, and
 an exponential of a negative of said double of said one log-operand.

12. The apparatus of claim 11, further comprising the step of:
 a log-calculator providing said first log-operand based upon a first operand;

wherein said non-additive primitive collection based upon one of said log-operands includes:
an approximation of said first operand,
an approximation of a square root of said first operand,
an approximation of a multiplicative inverse of said first operand,
an approximation of a multiplicative inverse of said square root of said first operand,
an approximation of a square of said first operand, and
an approximation of a multiplicative inverse of said square of said first operand.

13. The apparatus of claim 12, wherein said approximations satisfy a precision standard.

14. The apparatus of claim 13, wherein said precision standard supports a member of the programming languages collection comprising: a version of Java, a version of C, a version of OpenGL, and a version of DirectX.

* * * * *